(12) United States Patent
Ryne et al.

(10) Patent No.: US 11,358,627 B2
(45) Date of Patent: Jun. 14, 2022

(54) SYSTEM, METHOD AND APPARATUS FOR A TELESCOPIC LEAD SCREW FOR A STEERING COLUMN

(71) Applicant: Steering Solutions IP Holding Corporation, Saginaw, MI (US)

(72) Inventors: Patrik Ryne, Lake Orion, MI (US); George E. Arlt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/036,047

(22) Filed: Sep. 29, 2020

(65) Prior Publication Data

US 2021/0129892 A1   May 6, 2021

Related U.S. Application Data

(60) Provisional application No. 62/931,348, filed on Nov. 6, 2019.

(51) Int. Cl.
*B62D 1/185* (2006.01)
*F16H 25/20* (2006.01)
*B62D 1/181* (2006.01)

(52) U.S. Cl.
CPC .............. *B62D 1/185* (2013.01); *B62D 1/181* (2013.01); *F16H 25/2015* (2013.01); *F16H 2025/2062* (2013.01)

(58) Field of Classification Search
CPC ........ B62D 1/185; B62D 1/181; B62D 1/183; F16H 25/2015; F16H 2025/2062; F16H 2025/2084; F16H 25/2056
See application file for complete search history.

(56) References Cited

U.S. PATENT DOCUMENTS

| | | | |
|---|---|---|---|
| 7,444,900 B2 * | 11/2008 | Tomaru ................. | B62D 1/181 74/493 |
| 2007/0137381 A1 * | 6/2007 | Arihara ................. | B62D 1/181 74/493 |
| 2018/0355958 A1 * | 12/2018 | Graham .............. | F16H 25/2454 |
| 2021/0061340 A1 * | 3/2021 | Wilkes .................... | B62D 1/181 |
| 2021/0129894 A1 * | 5/2021 | Ryne ...................... | B60K 37/06 |

FOREIGN PATENT DOCUMENTS

| | | | | |
|---|---|---|---|---|
| DE | 102018212696 B3 * | 11/2019 | ......... | F16H 25/2056 |
| WO | WO-2021032525 A1 * | 2/2021 | ............. | B62D 1/192 |

* cited by examiner

*Primary Examiner* — Drew J Brown
(74) *Attorney, Agent, or Firm* — Dickinson Wright PLLC

(57) ABSTRACT

A steering column assembly includes a jacket. The assembly also includes a plurality of cylindrical lead screws threadably coupled to each other, the plurality of lead screws rotatable relative to each other and translatable relative to each other. The assembly further includes a nut threadably coupled to one of the plurality of lead screws and operatively coupled to the jacket to axially move the jacket.

12 Claims, 4 Drawing Sheets

SYSTEM, METHOD AND APPARATUS FOR A TELESCOPIC LEAD SCREW FOR A STEERING COLUMN

CROSS-REFERENCE TO RELATED APPLICATION

This application claims the benefit of priority to U.S. Provisional Patent Application Ser. No. 62/931,348, filed Nov. 6, 2019, the disclosure of which is incorporated by reference herein in its entirety.

BACKGROUND

Conventional steering columns can be electromechanically adjusted via actuators. Depending on the user requirements, such columns can be adjusted in various directions, including the telescope (i.e., along the axis of the column), rake (i.e., vertically) and/or tilt (i.e., pivot angle) directions. Steering columns can telescope in several ways. For example, some steering columns telescope via telescoping jackets or shafts. Other examples of steering columns can telescope via a fixed shaft and a translating jacket assembly.

Power telescopic columns typically are actuated by a single lead screw and nut. For normal amounts of telescopic movement (e.g., +/−30 mm) a single lead screw is sufficient and it packages within the typical column space. The limit to the amount of telescopic travel for a single lead screw is the axial package space available between the front of dash and the rear of dash. Conventional solutions also have other limitations. Telescopic steering columns can increase the amount of space required by the steering column assembly to operate in the underlying structure. As some end use applications are actually decreasing the space available for steering column assembles, the existing telescopic solutions are becoming an issue.

In the past, a function of telescopic steering columns was to provide flexibility in the location of the hand wheel and facilitate comfortable driving positions for different sizes of drivers. Now there are opportunities for significantly more telescopic travel, which also may be referred to as stow travel (i.e., when the hand wheel is not needed). For example, the hand wheel could be repositioned completely away from the driver to allow him or her to do things other than operate the vehicle, such as work on a laptop computer when the vehicle is parked or. Other examples include vehicles with autonomous driving capability, and the ability to stow the hand wheel when the vehicle is in an autonomous driving mode. For a significantly greater amount of telescopic and stow capacity, a single lead screw will not package between the rear of dash and the front of dash for any normal passenger vehicle. Thus, improvements in the compact adjustment of steering columns continue to be of interest.

SUMMARY OF THE INVENTION

According to one aspect of the disclosure, a steering column assembly includes a jacket. The assembly also includes a first lead screw rotatably driven by an actuator. The assembly further includes a second lead screw threadably coupled to the first lead screw. The assembly yet further includes a nut threadably coupled to the second lead screw and operatively coupled to the jacket to axially move the jacket.

According to another aspect of the disclosure, a steering column assembly includes a jacket. The assembly also includes a plurality of cylindrical lead screws threadably coupled to each other, the plurality of lead screws rotatable relative to each other and translatable relative to each other. The assembly further includes a nut threadably coupled to one of the plurality of lead screws and operatively coupled to the jacket to axially move the jacket.

According to yet another aspect of the disclosure, a steering column assembly includes a jacket. The assembly also includes an electric actuator. The assembly further includes a first lead screw rotatably driven by the electric actuator, the first lead screw having an outer threading. The assembly yet further includes a second lead screw having an inner threading engaged with the outer threading of the first lead screw, the second lead screw rotatable relative to the first lead screw and translatable relative to the first lead screw. The assembly also includes a nut having an inner threading engaged with an outer threading of the second lead screw, the nut fixed to a telescope drive bracket to prevent rotation of the nut, wherein rotation of the second lead screw axially translates the nut and the telescope drive bracket to axially translate the jacket that the telescope drive bracket is operatively coupled to.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the various embodiments are shown and described herein, without limiting same, FIGS. 1-4 illustrate embodiments of a system, method and apparatus for a telescopic lead screw assembly for a steering column.

Figure 1:
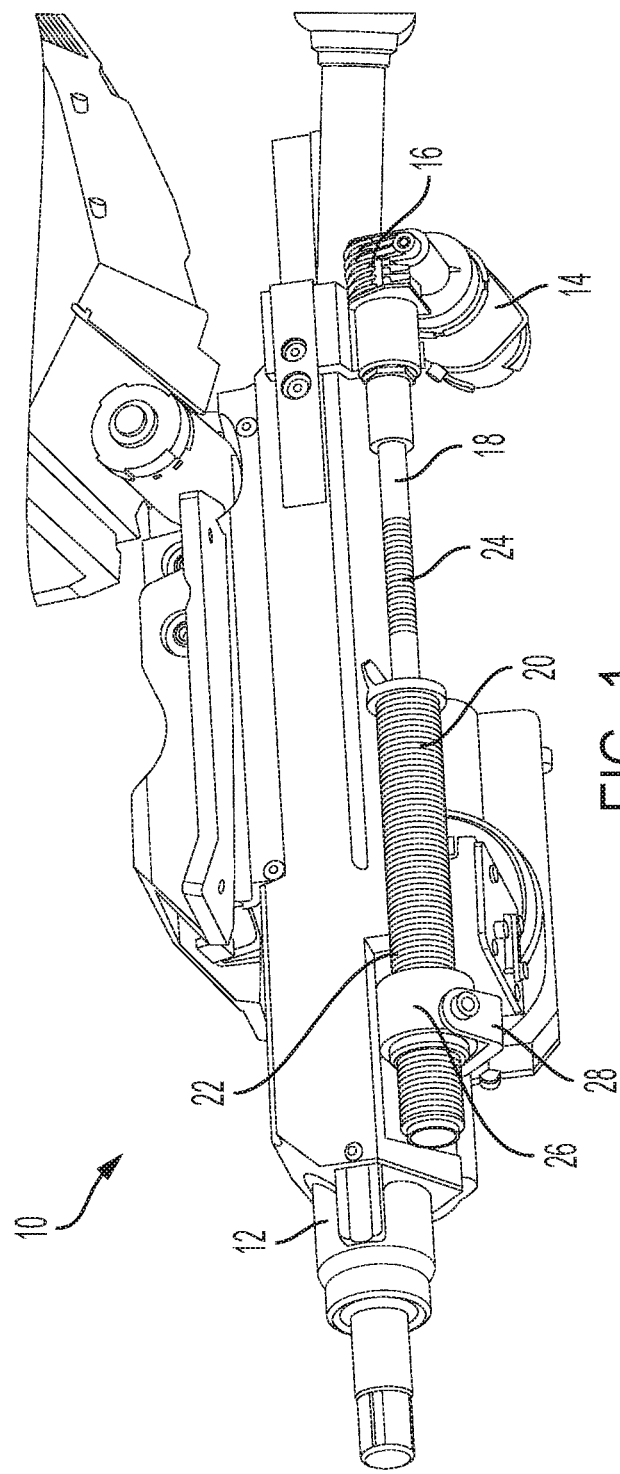
FIG. 1 is a perspective view of a telescopic lead screw assembly for a steering column.

Referring now to FIG. 1, a telescopic lead screw assembly is shown and generally referenced with numeral 10. The lead screw assembly 10 is operatively coupled to a portion of a jacket assembly 12. In some embodiments, the lead screw assembly 10 is coupled to an upper jacket that telescopes within another jacket portion in a multiple piece jacket assembly, while it is also contemplated that a single jacket may be translatable. Regardless of the precise type of jacket assembly, at least one jacket portion translates toward and away from a driver. In some embodiments, the translation/telescoping range of travel is significant enough for the steering column to be considered "stowed", which provides the driver ample space to carry out non-driving functions, either while parked or while the vehicle is operating in a semi-autonomous or autonomous mode. The lead screw assembly 10 described herein facilitates significant telescoping and/or translating range of travel.

The lead screw assembly includes an electric motor 14 that drives a gearbox 16. The gearbox 16 is operatively coupled to a first lead screw 18. The first lead screw 18 is rotatably driven by the electric motor 14 via connection through the gearbox 16. During rotation, the first lead screw 18 is maintained in a constant axial position.

A second lead screw 20 includes an inner threading and an outer threading 22. The inner threading of the second lead screw 20 is engaged with an outer threading 24 of the first lead screw 18. Unlike the first lead screw 18, the second lead screw 20 is free to translate axially along the first lead screw 18 and free to rotate. In this way, while the element is referred to as a lead screw herein, the second lead screw 20 may also be considered a floating nut.

A nut 26 includes an internal threading that is engaged with the outer threading 22 of the second lead screw 20 in a manner that allows the nut 26 to translate axially along the second lead screw 20 during rotation of the second lead screw 20. This is due to constraint of potential rotational motion of the nut 26. The constraint is accomplished with connection of the nut 26 to a telescope drive bracket 28 that is operatively coupled to the jacket assembly 12. In particular, the telescope drive bracket 28 is coupled to the portion of the jacket assembly 12 that is configured to telescope and/or translate for adjustment of the steering column position.

Figure 2:
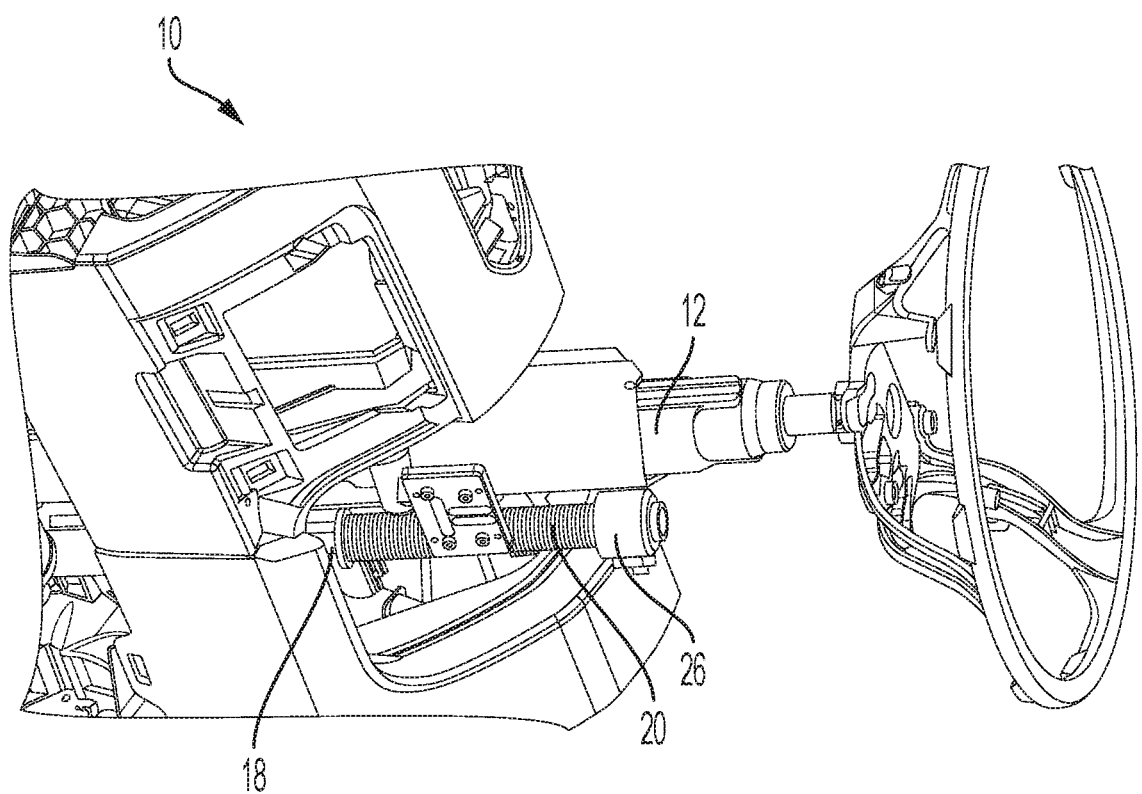
FIG. 2 is a perspective view of the telescopic lead screw assembly, shown in a first position.
Figure 3:
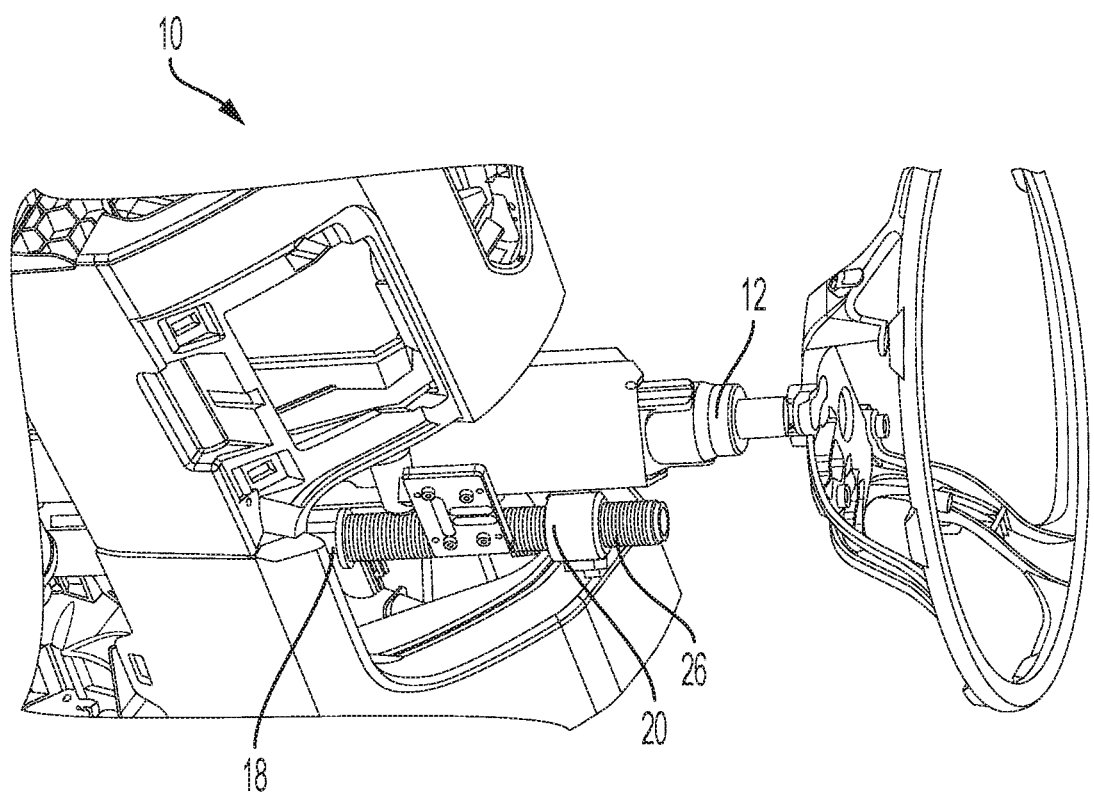
FIG. 3 is a perspective view of the telescopic lead screw, shown in a second position.
Figure 4:
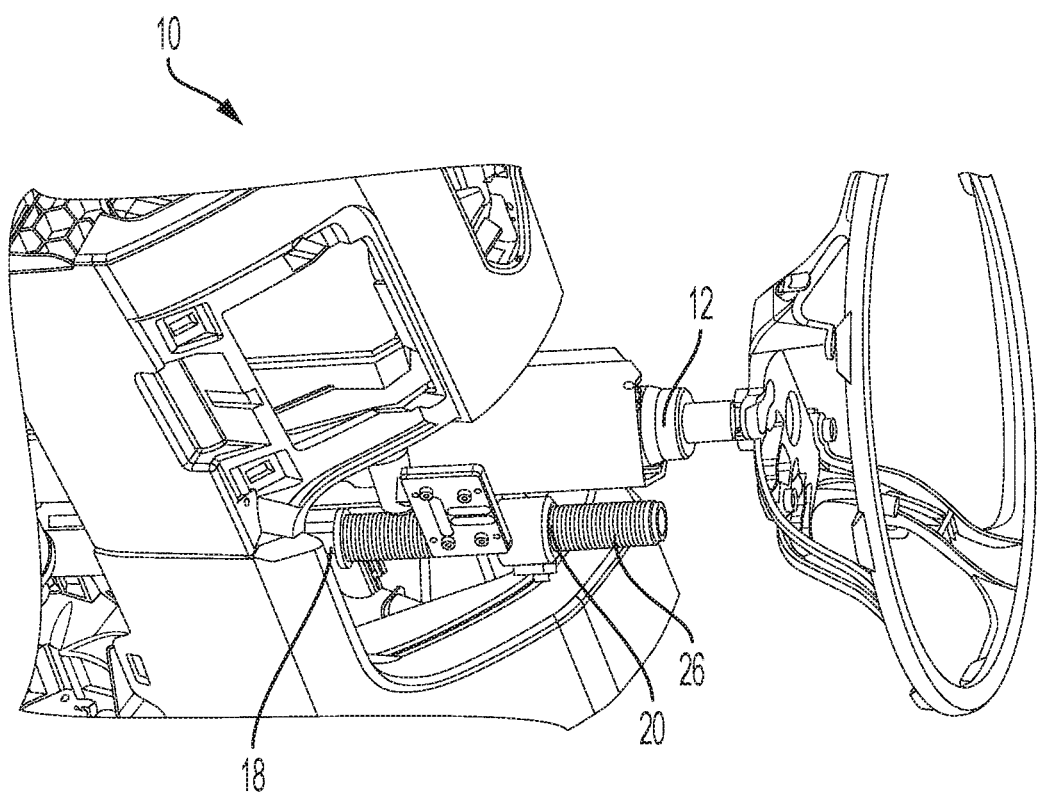
FIG. 4 is a perspective view of the telescopic lead screw, shown in a third position.

Referring now to FIGS. 2-4, in operation, the first lead screw 18 is rotated by the electric motor 14 and held in a constant axial position. During rotation of the first lead screw 18, the second lead screw is axially translated along the first lead screw 18 between a first end stop and a second end stop. The first end stop is positioned to define a first axial travel stop for the second lead screw 20 and the second end stop is positioned to define a second axial travel stop for the second lead screw 20. Movement between the axial travel stop positions of the second lead screw 20 allows further extension and retraction of the nut 26 that is operatively coupled to the jacket assembly 12.

During rotation of the second lead screw 20, the nut 26 is axially translated along the second lead screw 20 between a third end stop and a fourth end stop, with the third end stop defining a first axial travel stop for the nut 26 and the fourth end stop defining a second axial travel stop for the nut 26.

As shown, FIG. 2 illustrates an example of an extended axial position of the steering column assembly. FIGS. 3 and 4 show gradual retraction to two additional axial positions of the steering column assembly.

The telescopic lead screw assembly 10 provides a greater amount of axial travel and stow capacity when compared to single lead screw and nut designs. For example, embodiments can provide axial travel that is greater than 100 mm, greater than 150 mm, greater than 200 mm, or even greater than 250 mm (e.g., 260 mm). Such versions of a telescopic lead screw assembly can package between the rear of dash and the front of dash for almost any passenger vehicle.

The embodiments disclosed herein significantly increase the amount of stow capability that can be achieved for any vehicle compared to a conventional telescoping mechanism, while avoiding drawbacks associated with other stowing assemblies.

The disclosed embodiments can utilize the available space in an environment in a more efficient way. For example, in steer-by-wire applications, this design can improve performance. Although applications having a large hand wheel actuator requiring additional space can restrict the effective use of the space for stow or storage of the steering column assembly (and hand wheel actuator), the embodiments disclosed herein can overcome such limitations. The steering column assembly can telescope different portions at the same time, or sequentially, during the stowing of the steering column assembly.

Any feature, element, component or advantage of any one embodiment can be used on any of the other embodiments.

While the various embodiments have been described in detail in connection with only a limited number of examples, it should be readily understood that they are not limited to such disclosed versions. Rather, the embodiments can be modified to incorporate any number of variations, alterations, substitutions or equivalent arrangements not heretofore described, but which are commensurate with the spirit and scope of this disclosure. Additionally, while various embodiments have been described, it is to be understood that aspects may include only some of the described features and components. Accordingly, the embodiments are not to be seen as limited by the foregoing description.

Having thus described the invention, it is claimed:

1. A steering column assembly, comprising:
   a jacket;
   a first lead screw rotatably driven by an actuator;
   a second lead screw threadably coupled to the first lead screw and driven by the same actuator as the first lead screw via rotation of the first lead screw; and
   a nut threadably coupled to the second lead screw and operatively coupled to the jacket to axially move the jacket.

2. The steering column assembly of claim 1, wherein the second lead screw includes an inner threading and an outer threading, the inner threading threadably coupled to an outer surface of the first lead screw.

3. The steering column assembly of claim 2, wherein the outer threading is threadably coupled to an inner surface of the nut.

4. The steering column assembly of claim 1, wherein the actuator is an electric motor.

5. The steering column assembly of claim 4, wherein the electric motor comprises an output shaft that is operatively coupled to a gearbox that is operatively coupled to the first screw and is configured to rotate the first lead screw.

6. The steering column assembly of claim 1, wherein the nut is operatively coupled to the jacket with a telescope drive bracket.

7. A steering column assembly comprising:
   a jacket;
   a plurality of cylindrical lead screws threadably coupled to each other, the plurality of lead screws rotatable relative to each other and translatable relative to each other and translated by a common actuator; and
   a nut threadably coupled to one of the plurality of lead screws and operatively coupled to the jacket to axially move the jacket.

8. The steering column assembly of claim 7, wherein the plurality of lead screws includes a driven lead screw and one or more additional lead screws.

9. The steering column assembly of claim 7, wherein the common actuator is an electric motor.

10. The steering column assembly of claim 9, wherein the electric motor comprises an output shaft that is operatively coupled to a gearbox that is operatively coupled to the driven lead screw and is configured to rotate the driven lead screw.

11. The steering column assembly of claim 7, wherein the nut is operatively coupled to the jacket with a telescope drive bracket.

12. A steering column assembly comprising:
    a jacket;

an electric actuator;
a first lead screw rotatably driven by the electric actuator, the first lead screw having an outer threading;
a second lead screw having an inner threading engaged with the outer threading of the first lead screw, the second lead screw rotatable relative to the first lead screw and translatable relative to the first lead screw, wherein the second lead screw is driven by the same electric actuator as the first lead screw via rotation of the first lead screw; and
a nut having an inner threading engaged with an outer threading of the second lead screw, the nut fixed to a telescope drive bracket to prevent rotation of the nut, wherein rotation of the second lead screw axially translates the nut and the telescope drive bracket to axially translate the jacket that the telescope drive bracket is operatively coupled to.

\* \* \* \* \*